United States Patent

Zimmermann

[15] 3,645,538

[45] Feb. 29, 1972

[54] DEVICE FOR POSITIONING A TAPE HEAD TO TRACKS OF A MULTITRACK RECORDING TAPE

[72] Inventor: Joseph James Zimmermann, Elm Grove, Wis.

[73] Assignee: GTE Automatic Electric Laboratories, Incorporated, Northlake, Ill.

[22] Filed: June 22, 1970

[21] Appl. No.: 48,368

[52] U.S. Cl. ....................................274/4 A, 179/100.2 CA

[51] Int. Cl. ..........................................................G11b 5/00

[58] Field of Search................274/4 A, 11 A; 179/100.2 CA, 179/100.2 MD

[56] References Cited

UNITED STATES PATENTS

| | | | |
|---|---|---|---|
| 2,933,319 | 4/1960 | Proctor | 274/11 A |
| 2,908,769 | 10/1959 | Fonda | 274/4 A |
| 3,443,037 | 5/1969 | Dann | 274/4 A |
| 3,506,272 | 4/1970 | Matsumoto | 274/4 A |
| 3,575,422 | 4/1971 | Warren et al. | 274/4 A |

*Primary Examiner*—Leonard Forman
*Assistant Examiner*—Dennis A. Dearing
*Attorney*—K. Mullerheim, David W. Heid and B. E. Franz

[57] ABSTRACT

A device for sequentially positioning a tape head to consecutive tracks of a cartridge-type multitrack recording tape, wherein a short section of heavy-type tape having a small rectangular opening formed therein is spliced into the tape loop. A sprocket gear having an associated spring-biased detent pawl is so located that the rectangular opening will successively engage one tooth of the gear at a time for each complete cycle, or revolution, of the tape, to cause the gear to rotate an angular increment determined in accordance with the number of teeth thereon. A cam is rotatably controlled by the gear for moving a cam follower, which is attached at one end to the tape head, for moving the tape head transversely across the tape to the next consecutive track. A manually operable indexing arrangement is provided for controlling the cam to move the tape head to any selected track on the tape.

7 Claims, 2 Drawing Figures

Patented Feb. 29, 1972 3,645,538

2 Sheets-Sheet 1

INVENTOR
JOSEPH JAMES ZIMMERMANN
BY
James T. Whitesel
AGENT

Patented Feb. 29, 1972 3,645,538

2 Sheets-Sheet 2

DEVICE FOR POSITIONING A TAPE HEAD TO TRACKS OF A MULTITRACK RECORDING TAPE

BACKGROUND OF THE INVENTION

1. Field

This invention relates in general to cartridge-type multitrack tape recording and reproducing machines, and more particularly to a device controlled by the tape for sequentially positioning a tape head to consecutive tracks on the tape. The device may be manually controlled for positioning the tape head to any selected track on the tape.

2. Prior Art

Many prior art cartridge-type multitrack recording an reproducing machines disclose the use of a cam and cam-follower arrangement for positioning the tape head with respect to the tracks on a tape. Generally, the arrangement includes a cam having a plurality of stepped, or graduated, different cam surfaces each of which is associated with a different track on the tape. A solenoid is used to drive a pawl which is coupled to a ratchet for moving the cam surfaces into engagement with the cam follower and thereby position the tape head to the track associated with the corresponding engaged cam surface. With this particular type of arrangement, certain of the cam surfaces when in contact with the cam follower cause an autorotation of the cam, thereby resulting in a misalignment of the tape head with the associated tracks. This arrangement also generally required that the cam be varied in elevation, in order for each of its surfaces to be indexed with the associated tracks on the tape, thereby causing the particular problem of maintaining the pawl in proper engagement with the ratchet, since the ratchet was coupled to the cam and moved with it during the indexing.

Various other devices, such as those employing a solenoid and plunger mechanically coupled with the rack of a rack-and-pinion mechanism, have been designed for the purpose of track changing. These devices however are costly to manufacture and complicated to assemble and adjust.

SUMMARY OF THE INVENTION

A primary object of the present invention is the provision of an improved device for sequentially positioning a tape head to consecutive tracks of a cartridge-type multitrack recording tape, wherein the device is simple in construction, economical to manufacture, accurate and reliable in operation and requires a minimum of maintenance and adjustment.

In the achievement of the above-mentioned object, there is provided in a preferred embodiment of the invention, a cam assembly essentially comprising a cylinder rotatably mounted between upper and lower mounting board frame sections of a recording and reproducing machine by means of an axial shaft, journaled in bearings provided in both the mounting boards. The cam profile resembles that of a substantially large flat washer having a sufficient internal diameter, whereby the cam is mounted on the periphery of the cylinder in an inclined position so that the plane of its working surface is oblique with respect to the axis of the shaft.

The tape head is mounted above the upper mounting board to a shaft, or linkage arm, slidably mounted therein, with its lower end being attached to a follower arm, which is continuously biased into engagement with the working face of the cam during all of its positions.

The tape cartridge, using an endless tape having a plurality of tracks, is mounted above the upper mounting board and is arranged in such a manner that the tape is guided to move longitudinally across the face of the head during all operations of the machine. A short section of heavy-type tape is spliced into the tape loop, with a small rectangular opening being formed in the heavy section.

A sprocket gear, of a diameter somewhat less than the cam and having an associated spring-biased detent pawl, is rotatably mounted above the upper mounting board and is so positioned with respect to the tape that the rectangular opening in the section of heavy tape will successively engage one tooth of the gear at a time for each complete cycle of revolution of the tape and thereby rotate the gear in angular increments, or steps. The cam assembly is thus arranged for rotation, normally under control of the sprocket gear or by a manual arrangement to position the tape head.

Briefly, when the operation of the machine is initiated, the tape loop is pulled in a clockwise direction from the tape cartridge, with the window in the tape engaging a single tooth of the sprocket gear to impart an angular increment of clockwise rotation to the gear. This increment of rotation of the sprocket gear is transferred to the cam assembly, which upon rotation causes the engaged roller end of the follower arm to ride up the inclined working face of the cam for moving the attached tape head transversely across the tape to a track thereon. Each subsequent cycle of rotation of the tape loop will cause a similar operation of the device to move the tape head to the next consecutive track. A manually operable indexing arrangement is provided for selectively controlling the cam assembly to position the tape head with a selected track on the tape.

DESCRIPTION OF THE DRAWINGS

The nature of the invention and its distinguishing features and advantages, which reside in the construction and the arrangement and combination of parts, will be more clearly understood from the following detailed description taken in conjunction with the accompanying drawings, wherein.

DETAILED DESCRIPTION

1. Structure

Figure 1:
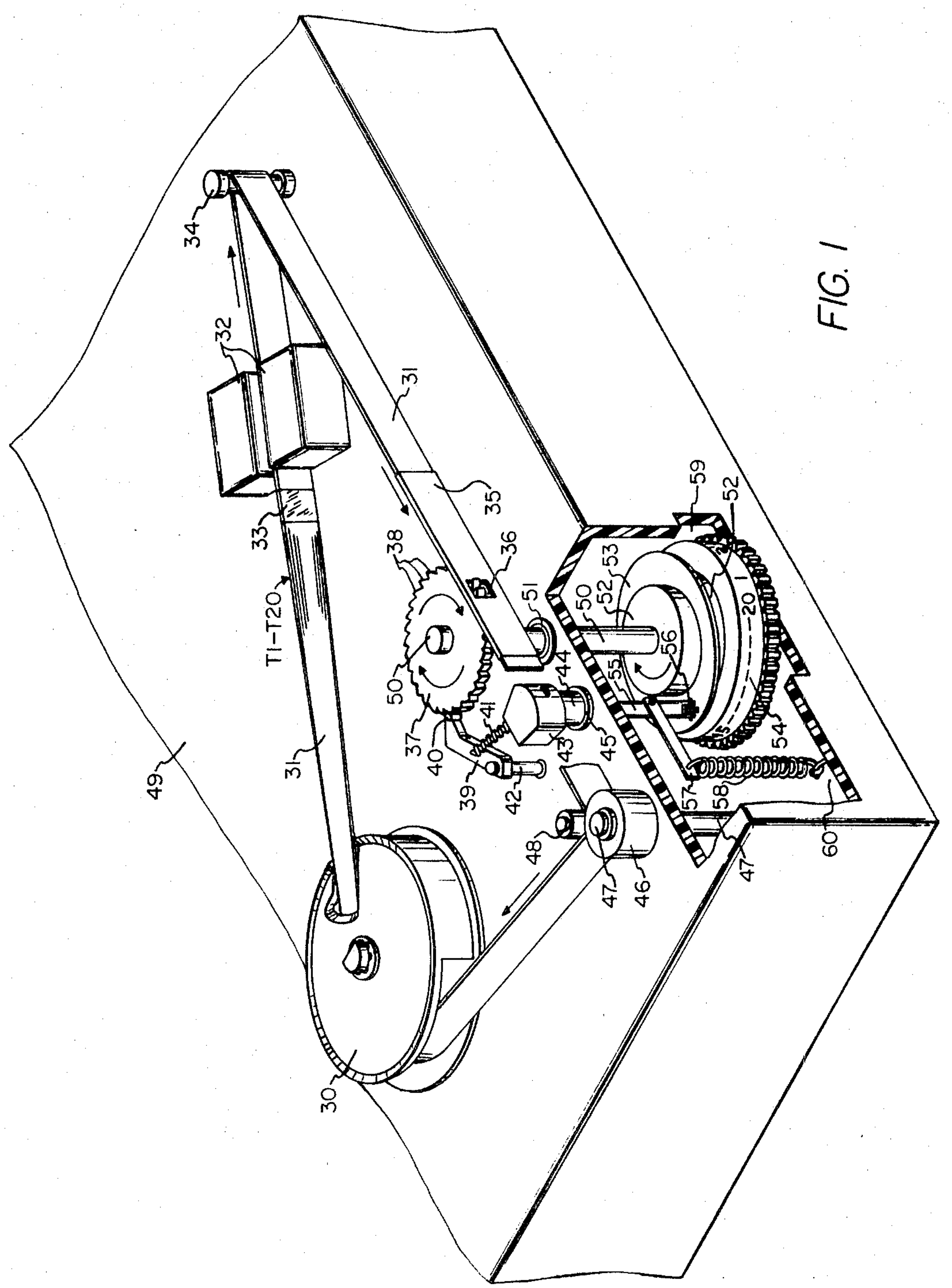
FIG. 1 is a partial sectionalized isometric view of the head-positioning device, according to one embodiment of the invention.

Referring in particular to FIG. 1 of the drawings, which shows a practical application of one preferred embodiment of the head-positioning device when incorporated into a tape recording and reproducing machine, it is pointed out that all of the standard and well-known components of the machine not pertinent to the invention have been omitted for the purpose of clarity in this description.

As shown in FIG. 1, tape cartridge 30 is mounted on top of upper mounting board 49 and contains the endless loop of magnetic tape 31, which extends from the center of cartridge 30, between the sections of photocell assembly 32, around guide roller 34, across teeth 38 of sprocket gear 37, and the face of tape head 43, between drive capstan 48 and pressure roller 46 and back into cartridge 30. Transparent section 33 and heavy tape section 35 are spliced into the loop of tape 31 at specific locations and provide later-described operating control functions. A rectangular-shaped window 36 is formed in the heavy tape section 35, also for a later-described purpose.

Shaft 50 of the head-positioning device extends through cam cylinder 52, which is attached to the lower midportion thereof. Indexing knob 54 is also mounted over shaft 50 and is secured to the lower end of cylinder 52. The lower end of shaft 50 is journaled in a bearing (not shown) in lower mounting board 60, while the upper end of shaft 50 extends through bearing 51 of the upper mounting board 49 for a sufficient distance in order that sprocket gear 37 may be attached to its upper end at a particular position whereby the teeth 38 of gear 37 may be individually engaged by window 36 of heavy tape section 35. Associated with the teeth 38 of sprocket gear 37 is detent pawl 39, which is pivotally mounted at post 42 and is continuously biased against teeth 38 by means of bias spring 41. It will be appreciated that the tooth-engaging end 40 of pawl 39 and the teeth 38 of sprocket gear 37 are so formed as to allow bidirectional rotation of gear 37, thus providing for manual positioning of the tape head 43 as will be described later.

The washer-shaped cam 53 is secured by any well-known means to cam cylinder 52 at an oblique plane, which is predetermined in accordance with the width or total number of tracks of the tape being used. In this manner, the lowest and highest points on the working surface of cam 53 correspond to the respective first and last tracks on tape 31, which for the purpose of this description is shown to contain tracks T1–T20, inclusive.

Tape head 43 is attached to shaft 44, which is slidably mounted in bearing 45 provided in upper mounting board 49, at a position directly above the working surface of cam 53 and is further positioned so that tape 31 will engage the face of head 43. The upper end of follower arm 55 is attached to shaft 44, and the lower end contains roller 56 for engaging the working surface of cam 53. One end of bias arm 57 is attached to follower arm 55, while the other end has bias spring 58 attached thereto for biasing roller 56 of the follower arm 55 into constant engagement with the surface of cam 53.

Indexing knob 54 is mounted to cylinder 52 of the cam assembly as mentioned above and is of a sufficient diameter, whereby both its dial and knurled portions extend through the slot 59 formed in the side frame of the machine. A pointer (not shown) may be inscribed in the surface of the side frame, above and at the midpoint of slot 59 to provide a reference point for reading the numerals on the dial of the knob 54. These numerals on the dial of knob 54 each correspond to an associated individual track on tape 31.

Figure 2:
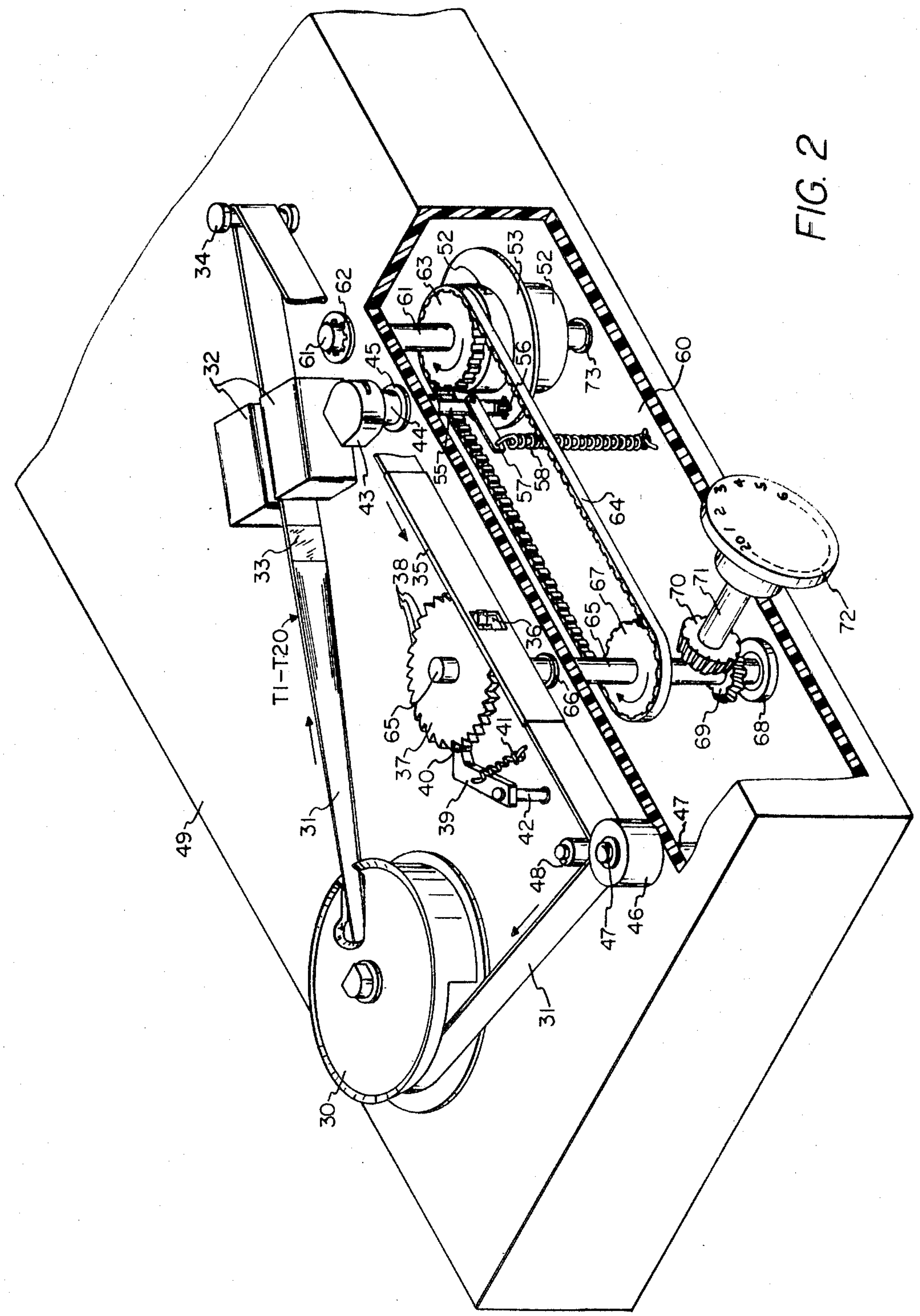
FIG. 2 is a partial sectionalized isometric view of the head-positioning device, according to another embodiment of the invention.

Referring to FIG. 2 of the drawings, the structural description of the other embodiment of the head-positioning device, when incorporated into a tape recording and reproducing machine, will now be given. As previously mentioned, all of the standard and well-known components of the machine not pertinent to the invention have been omitted for the purpose of clarity. It will be appreciated that all of the apparatus of FIG. 2 similar or identical to that of FIG. 1 have been given the same reference character numbers for the further purpose of simplicity and understanding.

As shown in FIG. 2, the tape cartridge 30, tape 31, photocell assembly 32, guide roller 34, drive capstan 48 and pressure roller 46 are all arranged on top of the upper mounting board in the same manner as previously described for FIG. 1. The loop of tape 31 includes the transparent section 33 and the heavy tape section 35 with its rectangular window 36, also as described. The cam assembly and sprocket gear assembly, however, are mounted on different shafts as will be hereafter described.

Cam cylinder 52 is attached to the lower midportion of shaft 61, with spur gear 63 being mounted over shaft 61 and secured to the top end of cylinder 52. The upper and lower ends of shaft 61 are journaled in bearings 62 and 73 of upper and lower mounting boards 49 and 60, respectively, at a position internal of the tape loop toward the right-hand corner of FIG. 2. As tape 31 is also assumed to contain tracks T1–T20, the washer-shaped cam 53 is secured to cam cylinder 52 at the same oblique plane and in the manner as previously described. Tape head 43 is attached to shaft 44, which is slidably mounted in bearing 45 of upper mounting board 49 at a position directly above the working surface of cam 53, and also at a position whereby tape 31 will engage the face of head 43. The follower assembly associated with head 43 is arranged and biased in the same manner as previously described, wherein roller 56 of follower 55 is continuously maintained in engagement with the working surface of cam 53 by means of spring 58.

Bevel gear 69 and spur gear 67 are attached to lower and midportions, respectively, of shaft 65. The lower end of shaft 65 is journaled in bearing 68 provided in the lower mounting board 60, while the upper portion of shaft 65 is journaled in bearing 66 in the upper mounting board 59. The upper end of shaft 65 protrudes a sufficient amount above the board 49 in order to enable sprocket gear 37 to be attached thereto. A toothed flexible belt 64 is provided for connecting spur gear 67 with spur gear 63, whereby the rotary motion from sprocket gear 37 is transferred to cam cylinder 52 of the cam assembly.

An indexing shaft 71 is mounted in any suitable manner (not shown) in the front side frame of the machine and contains a bevel gear 70 attached to its inner end in such a manner that it continuously engages bevel gear 69. Indexing knob 72 is attached to the outside end of shaft 71, and contains a numerically inscribed dial face. A pointer, or scribe mark, (not shown) may be inscribed in the surface of the side frame directly above the midpoint of the dial to provide a reference point for reading the numerals on the dial.

It will be noted that while the sprocket gear, pawl, cam assembly and associated shafts may be of a metallic composition, they could be constructed from a suitable plastic material, thereby providing ease of assembly and utilizing an inherent property in the plastic of self-lubrication.

2. Operation

Before beginning the operational description of the head-positioning device, it is thought advisable to mention that due to the specific nature of the invention, such well-known apparatus as motors, relays, operating and controlling circuitry and other electrical and mechanical components, which are all normally essential to tape recording and reproducing machines, have been omitted from the disclosure. However, in order to intelligently describe the operation of the head-positioning device, it will be assumed that the device is incorporated into a tape recording and reproducing machine including the above-mentioned known apparatus. It will also be appreciated that while only one magnetic tape head is disclosed, the head may be of the type which in accordance with a selected function will erase a previously recorded message, or data, simultaneous with the recording of new information, or will function to only play back the recorded message, or data. It is further pointed out that neither FIG. 1 or FIG. 2 show the normal, or stop, position of the tape with respect to the head-positioning device for the reason that it was thought best to show the actual head-positioning operation, wherein one tooth of the sprocket gear is engaged by the window in the heavy section of tape as the tape moves across the gear teeth. In the normal, or stop, position of the machine, the window in the heavy tape section is positioned to the left of the sprocket gear teeth and the transparent section of the tape is at the immediate right of the photocell assembly.

In describing the operation of the head-positioning device such as disclosed in FIG. 1, it will first be assumed that the machine is at the normal position described above, wherein window 36 in heavy tape section 35 is located to the left of sprocket gear 37 and not engaging any of the teeth 38, and that transparent section 33 of tape 31 is located to the immediate right of photocell assembly 32. It will also be assumed that tape head 43 is positioned with the lowest, or first track T1 of tape 31.

In order to start the machine in a cycle of operation, any well-known means, such as a "start" switch is operated to complete an energizing circuit for the drive motor (all not shown), whereby tape 31 is pulled by means of the drive capstan 48 in the direction of the arrows from cartridge 30, across tape head 43 and back into cartridge 30, with the tape head 43 functioning in accordance with a previously selected operating function. The above movement of tape 31 continues in the normal direction and manner until the heavy tape section 35 is drawn across the teeth 38 of sprocket gear 37, at which time window 36 engages one of the teeth 38 and by means of the tape movement causes an increment of angular rotation of gear 37 in a clockwise direction. Shaft 50, cylinder 52, cam 53 and indexing knob 54 are accordingly rotated the same increment of angular movement also in a clockwise direction. In response to this rotation of cam 53, roller 56 of follower arm 55 rides up the inclined surface of cam 53 against the biasing action of spring 58 and by so doing, slides shaft 44 upward in bearing 45 for raising the attached tape head 43 a sufficient amount to align its face with the next successive tape track, which for the present description is track T2. At this time the numeral 2 on the dial of indexing knob 54 is aligned with the previously mentioned pointer (not shown) located in the side frame surface directly above the midpoint of the dial for visually indicating the track number that head 43 is aligned with.

During the above-described movement of tape 31, transparent section 33 enters the photocell assembly 32 at approximately the same time that window 36 disengages from the particular tooth 38 that it has been engaged with, whereby the photocell assembly 32 is operated to open the energizing circuit to the drive motor (not shown). The machine thereafter comes to a stop in its normal position, wherein the transparent section 33 is located to the immediate right of photocell assembly 32 and window 36 is located at the immediate left of sprocket gear 37. Tape head 43 may be sequentially positioned to the next successive track, or tracks, on tape 31 by repeating the above-described cycle of operation once for each track.

Tape head 43 may be manually positioned to any selected track on tape 31 in response to the manual rotation of indexing knob 54 in either the clockwise or counterclockwise direction to raise or lower head 43 to the track corresponding to the numeral on the dial of knob 54 that is aligned with the aforementioned pointer. Since indexing knob 54 is attached to cylinder 52, cam 53 will rotate therewith to position head 43. Detent pawl 39 is sufficiently biased against teeth 38 of gear 37 to prevent any unnatural rotation of gear 37 in either direction, thereby maintaining tape head 43 in proper track alignment.

Referring now to FIG. 2, it will be assumed that the machine is in the same normal position as described for FIG. 1, with tape head 43 aligned with track T1 of tape 31 and that the machine is thereafter started in a cycle of operation also as described. Tape 31 thereupon follows the same direction and path as described, with head 43 functioning in accordance with a previously selected operating function. This movement of tape 31 continues as previously described until window 36 of heavy tape section 35 engages one of the teeth 38 of sprocket gear 37 to cause an increment of angular rotation of gear 37 in a clockwise direction. Shaft 65, spur gear 67, engaged bevel gears 69 and 70 shaft 71 and indexing knob 72 are all accordingly rotated the same increment of angular movement also in a clockwise direction. This angular clockwise movement of spur gear 67 is transferred by means of flexible belt 64 to spur gear 63, and hence to cam cylinder 52 and its attached cam 53. Roller 56 of follower arm 55 rides up the inclined surface of cam 53, in response to the rotation thereof and against the biasing action of spring 58, for sliding shaft 44 upward in bearing 45 so that tape head 43 is correspondingly raised a sufficient amount to align its face with the next successive tape track, which accordingly is track T2. AT this time the numeral 2 on the dial face of indexing knob 72 is aligned with the previously mentioned pointer (not shown) located in the side frame surface directly above the midpoint of the dial for indicating the track number that head 43 is aligned with.

The machine is thereafter brought to a stop in its normal position by means of the photocell assembly 32 and the transparent section 33 of tape 31 such as previously described. In the normal position of the machine, transparent section 33 and window 36 are also located in their previously described positions. In order to sequentially position tape head 43 to the next successive track, or tracks, on tape 31, it is only necessary to repeat the above-described cycle of operation once for each track.

Tape head 43 may be manually positioned to any selected track on tape 31 in response to the manual rotation of indexing knob 72 in either the clockwise or counterclockwise direction to either raise or lower head 43 to the track corresponding to the numeral on the dial of knob 72 that is aligned with the aforementioned pointer. Since rotation of indexing knob 72 is transferred from bevel gears 70 and 69 to spur gear 67 and hence to spur gear 63 by means of belt 64, cam 53 will be rotated accordingly to position head 43 in the same manner as previously described.

From the foregoing, it is therefore quite evident that a head-positioning device is provided that is normally controlled by the tape for sequentially moving the head to consecutive tracks on a cartridge-type multitrack recording tape with the device being manually controlled to selectively move the head to a selected track on the tape, and wherein the device is easy to manufacture and assemble, simple and accurate in operation and requires a minimum of maintenance and adjustment.

While a practical application of the invention has described the use of the head-positioning device when incorporated into a radio or telephone recorder/announcement type of machine, it will be appreciated that it is also readily adaptable for use with warning devices, automatic repertory telephone dialing machines, entertainment-type tape recorders and reproducers and other similar machines.

Having described my invention, what is considered new and is desired to have protected by Letters Patent will be pointed out in the appended claims.

What is claimed is:

1. Head-positioning apparatus adapted for use with a recording and reproducing machine utilizing a multitrack tape, comprising: a support; a tape cartridge mounted on top of said support; an endless loop of tape contained within said cartridge; said endless tape loop including a heavy section of tape having a rectangular opening formed therein; a cam rotatably mounted within said support and including a working surface forming an oblique plane with respect to the axis of its rotatable mounting; a linkage arm slidably mounted through the top of said support and including means attached to its inner end for engaging said working surface of said cam; a tape head attached to the other end of said linkage arm extending above the top of said support; a sprocket gear rotatably mounted on top of said support; means positioned on top of said support for guiding said loop of tape in a continuous path from said cartridge across the face of said tape head and the teeth of said sprocket gear and into said cartridge; a capstan assembly for pulling said tape loop in cycles of a specific direction of movement along said path; said window in said heavy tape section engaging a single tooth of said sprocket gear in succession for rotating said gear an angular increment per each said cycle of said tape movement; and means for transferring said increments of angular rotation of said sprocket gear to said cam; said means attached to said inner end of said linkage arm controlled by said working surface of said cam in response to each of said increments of angular rotation for sliding said linkage arm in said mounting and thereby move said attached tape head in a transverse direction of movements across said tape from one track thereon to the next track in sequence.

2. Head-positioning apparatus in accordance with claim 1; wherein said means for transferring said increments of angular rotation of said sprocket gear to said cam comprise a single shaft having said gear and said cam rigidly attached thereto.

3. Head-positioning apparatus in accordance with claim 2; including a manual indexing knob attached to the bottom end of said cam; said indexing knob including a dial portion having a plurality of sequential numbers thereon, each corresponding to an individual track of said tape; said cam rotated in response to a manual rotation of said knob to a selected number on said dial portion for controlling said linkage arm to move said attached tape head in said transverse direction of movement across said tape to the track thereon corresponding to said selected number.

4. Head-positioning apparatus in accordance with claim 1; including a detent pawl biased against the teeth of said sprocket gear for holding said gear and said cam against unnatural rotation, thereby maintaining said tape head in aligned positions with respect to said tracks on said tape.

5. Head-positioning apparatus in accordance with claim 1; wherein said cam and said sprocket gear are secured to individual shafts; and wherein said means for transferring said increments of angular rotation of said sprocket gear to said cam includes a spur gear attached to each of said shafts and a toothed belt engaged with each of said spur gears.

6. Head-positioning apparatus in accordance with claim 5; including a manual indexing knob; and means for coupling said indexing knob with said shaft individual to said sprocket gear; said indexing knob including a dial having a plurality of sequential numbers thereon, each corresponding to an individual track of said tape; said cam rotated via said spur gears and said engaged belt in response to a manual rotation of said indexing knob to a selected number on said dial portion for controlling said linkage arm to move said attached tape head in said transverse direction of movement across said tape to the track thereon corresponding to said selected number.

7. Head-positioning apparatus adapted for use with a recording and reproducing machine utilizing a multitrack tape, comprising: a support having top and bottom portions; a linkage arm slidably mounted through said top portion; a tape head attached to the top end of said linkage arm extending above the upper surface of said top portion; a roller attached to said bottom end of said linkage arm; a tape cartridge, including an endless loop of tape, mounted on said upper surface of said top portion; said loop of tape including a short heavy section of tape having a small rectangular opening formed therein; a sprocket gear positioned above said upper surface of said top portion and rotatably mounted with respect thereto; a cylinder having a cam surface mounted around its periphery in an oblique plane; said cylinder rotatably mounted between said top and said bottom portions at a position so that said cam surface is continuously engaged by said roller of said linkage arm; means for guiding said loop of tape from said cartridge in a path across the face of said head and the teeth of said sprocket gear and into said cartridge; a capstan assembly for pulling said tape loop in cycles of a specific direction of movement along said path; said window in said heavy tape section individually engaging each successive tooth of said sprocket gear during each consecutive one of said cycles of said tape movement for producing corresponding increments of angular rotation of said gear; and means for transferring said increments of angular rotation of said sprocket gear to said cylinder and said associated cam surface; said linkage arm controlled by said roller engaging said cam surface in response to said increments of angular rotation thereof for moving said attached tape head in individual transverse movements across said tape to sequential tracks thereon, each of which correspond to a successive one of said increments of angular rotation.

* * * * *

UNITED STATES PATENT OFFICE

CERTIFICATE OF CORRECTION

Patent No. 3645538 Dated ~~February 29, 1972~~

Inventor(s) J. J. ZIMMERMANN

It is certified that error appears in the above-identified patent and that said Letters Patent are hereby corrected as shown below:

On the cover page, line [73], after "Laboratories" delete -- , (comma) --

Column 7, line 4, after "dial" add -- portion --.

Signed and sealed this 17th day of April 1973.

(SEAL)
Attest:

EDWARD M.FLETCHER,JR.
Attesting Officer

ROBERT GOTTSCHALK
Commissioner of Patents

11/18/72

FORM PO-1050 (10-69)

USCOMM-DC 60376-P69
★ U.S. GOVERNMENT PRINTING OFFICE : 1969 O—366-334